No. 653,333. Patented July 10, 1900.
L. A. ASPINWALL.
LIQUID SPRAYER.
(Application filed Jan. 6, 1900.)

(No Model.) 3 Sheets—Sheet 1.

Witnesses:
J. Staib
Chas. H. Smith

Inventor:
Lewis A. Aspinwall
per L. W. Serrell
Atty.

THE NORRIS PETERS CO., PHOTO-LITHO., WASHINGTON, D. C.

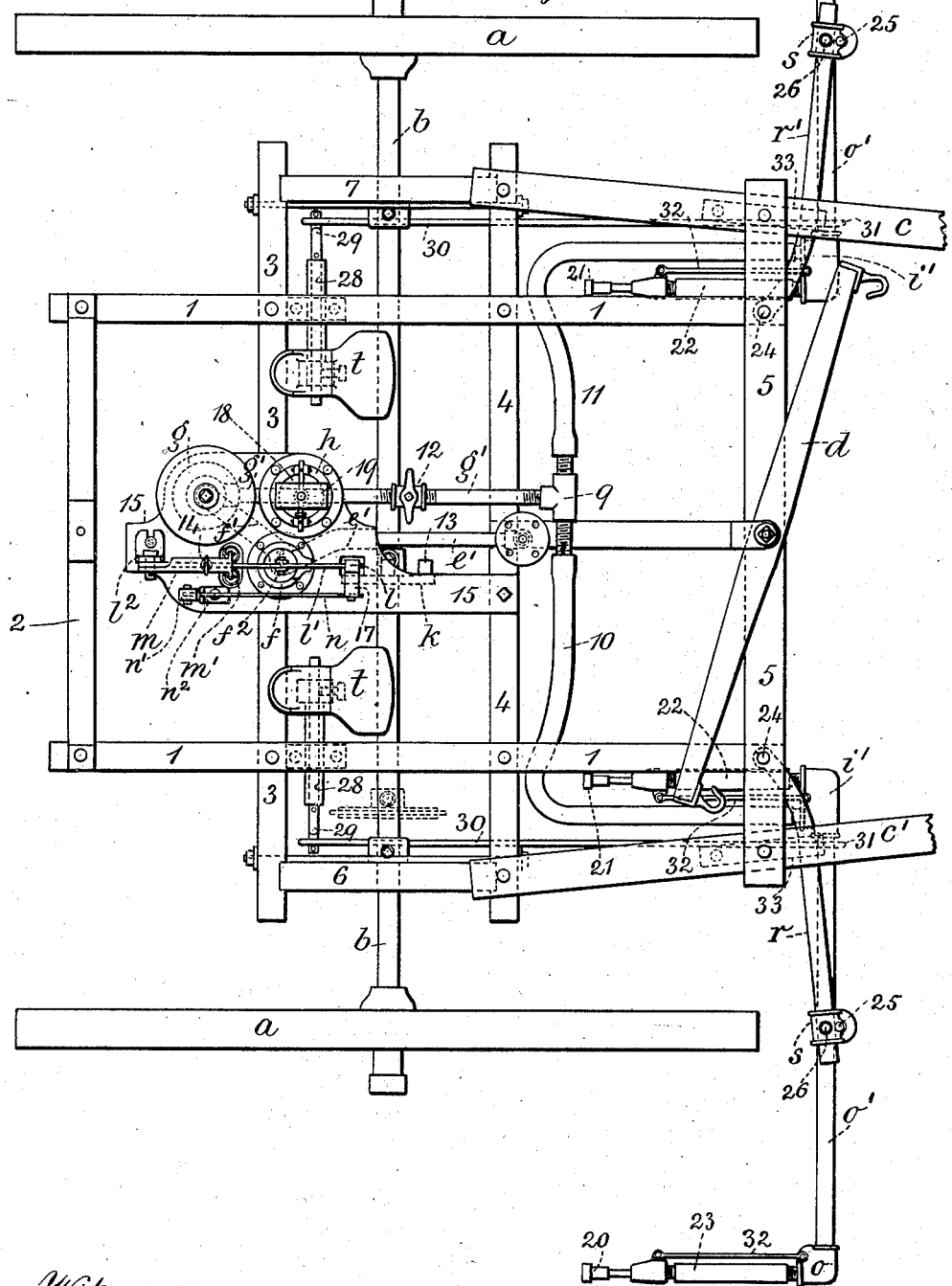

No. 653,333. Patented July 10, 1900.
L. A. ASPINWALL.
LIQUID SPRAYER.
(Application filed Jan. 6, 1900.)
(No Model.) 3 Sheets—Sheet 3.
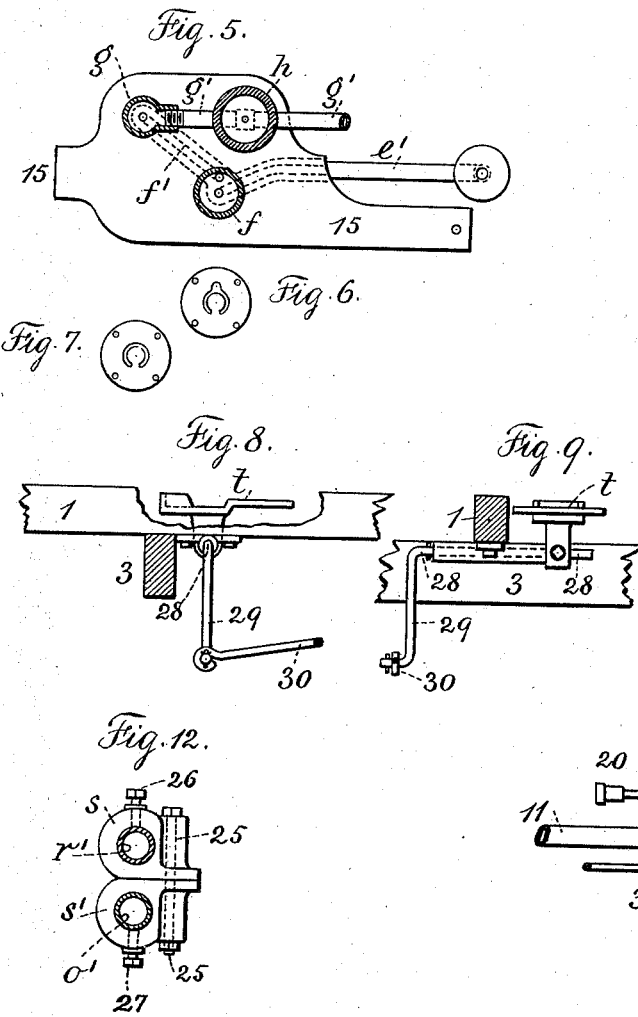

UNITED STATES PATENT OFFICE.

LEWIS AUGUSTUS ASPINWALL, OF JACKSON, MICHIGAN, ASSIGNOR TO THE ASPINWALL MANUFACTURING COMPANY, OF SAME PLACE.

LIQUID-SPRAYER.

SPECIFICATION forming part of Letters Patent No. 653,333, dated July 10, 1900.

Application filed January 6, 1900. Serial No. 537. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Liquid-Sprayers, of which the following is a specification.

My invention relates to a liquid-spraying device mounted on wheels and adapted to be moved about from place to place, especially through a field of potatoes for spraying the rows of plants with a liquid solution of paris-green or similar poisonous material for killing potato-bugs or other insects.

In carrying out my invention the water is contained in a barrel or receptacle mounted on the frame of the vehicle, and the water is conveyed from said receptacle by a pipe to a pump the plunger of which is operated by suitable devices from the axle of the vehicle as the same revolves. From the pump the water is passed to an air-chamber and from thence beneath a receptacle holding paris-green or similar poisonous material, in which pressure is applied to the contents to force the same into the flowing stream of water, the mixture then passing through flexible pipes and connections to adjustable spraying-nozzles to be delivered on the plants.

The operations of the devices and also of the adjustable spraying-nozzles are effected by the operator, for whom a seat is provided on the vehicle, the said operator at the same time driving and directing the animal moving the device through the field.

Figure 1:
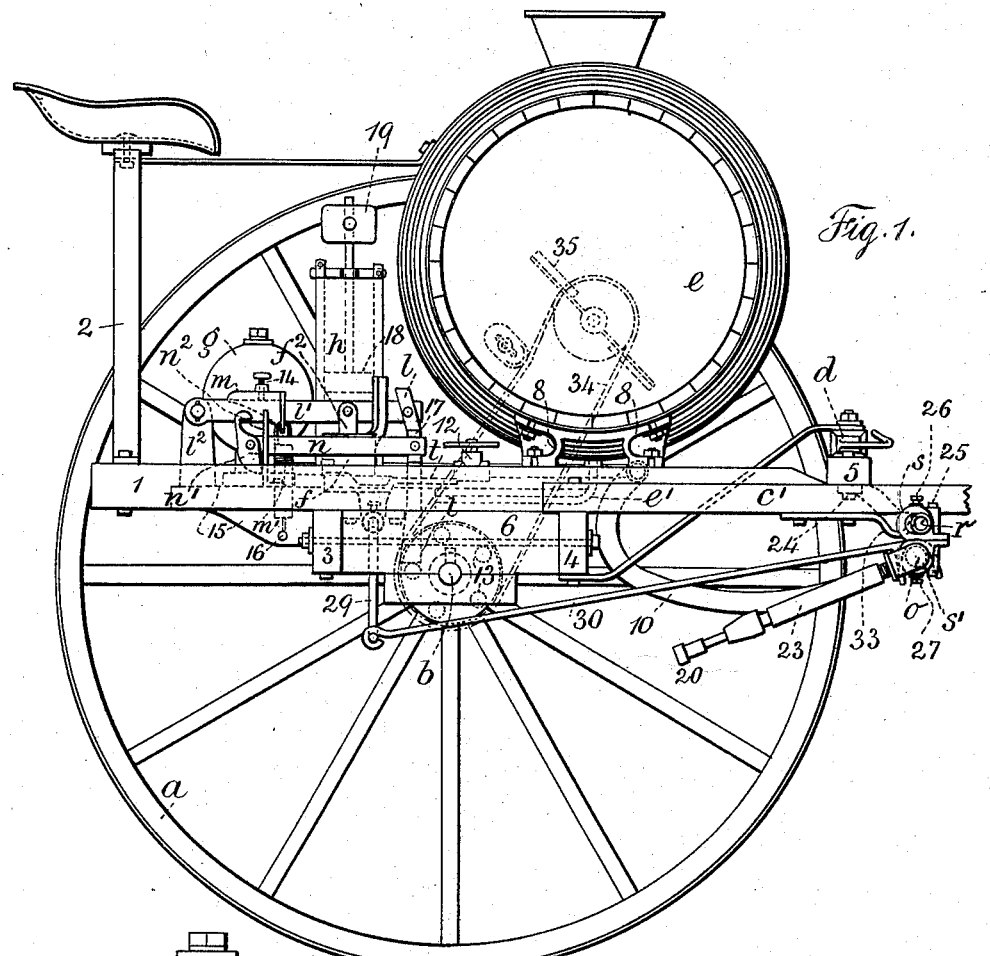
Figure 3:
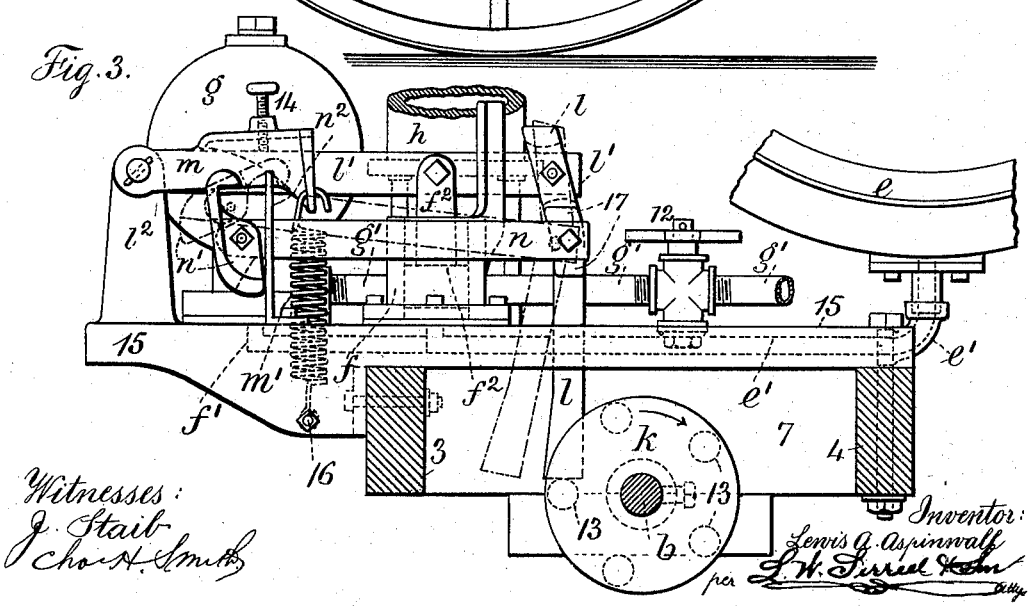

In the drawings, Figure 1 is an elevation of the devices forming my invention with one wheel of the vehicle removed, so that the parts may be readily seen. Fig. 2 is a plan of the said device with the water-barrel and seat removed, the shafts being broken. Fig. 3 is an elevation and partial section, in exaggerated size, showing the operation of the pump and the adjacent and connected parts; and Figs. 4 to 12, inclusive, show details of devices more particularly hereinafter described.

The wheels $a$ are mounted upon the axle $b$, and a frame composed of the longitudinal members 1 and the transverse members 3, 4, and 5, with the short end pieces 6 and 7, all connected together and to the axle $b$, serve as a platform for carrying the various parts of the mechanism and also to attach thereto the respective ends of the shafts $c$ $c'$ and the whiffletree $d$, so as to provide for drawing about the vehicle. The seat-support bar is shown at 2.

The water-barrel $e$ is supported upon the frame in any desired manner. I have shown a bracket-support 8 therefor, and a pipe $e'$ leads from the barrel $e$ to the pump $f$. A pipe $f'$ leads from the pump to an air-chamber $g$, and a pipe $g'$ extends from the air-chamber $g$ to and under the receptacle $h$, holding paris-green or other poisonous material, and therefrom this pipe $g'$ extends forward to the T-head 9, from which extend flexible branches 10 11, that reach to the forward part of the vehicle and connect with the coupling-heads $i'$ $i'$. In the pipe $g'$ is a cock 12, by which the flow of the liquid is regulated and may be cut off when turning or passing from field to field.

Upon the axle $b$ there is a disk $k$, having equidistant studs 13, and a bar $l$, placed approximately vertical, is connected near its upper end to the pump-beam $l'$, which extends toward the back of the vehicle and is pivoted to a standard $l^2$ upon a platform 15, supported by the framework of the vehicle. Upon the pivot connecting the beam $l'$ to the standard $l^2$ is a yoke $m$, straddling the beam and provided with a set-screw 14, bearing upon the top edge of the beam, and springs $m'$ are connected at their upper ends to the lower ends of the said yoke and at their lower ends to a bolt 16, passing through the platform 15, the said springs acting to pull down the pump-beam $l'$, and the set-screws 14 serving to strain and apply tension to the springs $m'$. The said pump-beam is elevated by the lower end of the bar $l$ coming in contact with the studs 13 of the disk $k$ by the rotation of the axle of the vehicle, and with the up-and-down movement of the pump-beam the plunger $f^2$ is operated to force the water drawn from the vessel $e$ into the air-chamber $g$, in which a pressure is created to force the water through the pipe $g'$ beneath the receptacle $h$ and forward toward the spraying devices.

A bracket 17 projects from and is integral with the bar $l$ and connects with a beam $n$, placed parallel with but lower than the pump-beam $l'$, and while the bar $l$ is pivoted to the pump-beam the bracket 17 connects the bar $l$ rigidly with the beam $n$, and at the rear end of the beam there is a hook device $n'$, and the rear end of this beam $n$ passes through a slotted standard $n^2$, supported upon the platform 15, which standard acts as a guide to the bar $l$ and beam $n$ as the same are operated by the studs 13, and the special office of the said parts is to draw the bar $l$ away from the studs 13 of the disk $k$ through the slot of the standard $n^2$, the said bar $l$ being swung on its pivotal connection with the pump-beam into the position shown in Fig. 3 by dotted lines, where the hook has been turned over the top of the slotted standard $n^2$, so as to hold back the said bar $l$ out of contact with the said studs 13. In this position the pump is out of operation, while the vehicle may be moved from place to place for service.

In the receptacle $h$ is a plunger 18, having a vertical stem carrying a weight 19. These are readily moved out of the receptacle for the insertion of paris-green or other poisonous material, and a short pipe 40 connects with the lower part of the receptacle $h$, and in this pipe is a cock to control the amount of paris-green or similar material ejected from the receptacle into the pipe $g'$, to which the pipe 20 is connected by a usual coupling. In view of the difficulties attending the use of paris-green in the form of dry powder I prefer to employ a paste or Bordeaux mixture of paris-green, as this readily disperses and commingles with the liquid and can be easily forced out of the receptacle into the water.

The spraying devices are alike at either side of the machine, and as similar characters of reference have been placed on corresponding parts the description of one will suffice for the description of the other. The spraying-nozzles 20 21 are connected to flexible pipes 22 23, extending to the coupling-heads $o$ and $i'$, between and connected to which are the pipes $o'$. Arms $r\ r'$ are secured by bolts 24 to the part 5 of the frame, and swivel-couplers $s\ s'$ receive the free ends of the arms $r\ r'$. These swivel-couplers are shown especially in Fig. 12, and they are of peculiar form and connected by the bolts 25 and adapted to turn at their meeting faces in relation to one another. Through the part $s'$ of the coupler the pipes $o'$ pass, and set-screws 26 27 serve to clamp the arms and pipes to the couplers, so as to adjustably fix the relation of the parts. The couplers $s$ can be moved along the arms $r\ r'$ when the set-screws 26 are loosened, and when the set-screws 27 are loosened the pipes $o'$ can be moved through the couplers $s'$ to adjust the position of the spraying-nozzles.

The feet of the driver or attendant are placed upon the platforms $t$, which platforms are connected to pivot-shafts 28, secured to the frame of the machine, the said pivot-shafts having cranks 29, from which extend the rods 30 toward the forward part of the machine, the free ends of the said rods having a yoke 31 straddling the pipes $o'$, as will be seen especially in Figs. 8, 9, and 10.

The spraying-nozzles 20 21 are connected by pivoted rods 32 to the coupling-heads $o$ and $i'$, so that the flexible pipes 22 and 23 will not bend or be strained by the weight of the spraying-nozzles, these rods 32 acting to hold the spraying-nozzles either at right angles to the pipes $o'$ or, when so placed, at acute or obtuse angles to said pipe, according to the direction that it is desired the spraying liquid shall take.

Straps 33 on the under side of the shafts pass around the arms $r\ r'$, so as to support the said arms forward of their pivots 24 and hold the said arms in substantially a fixed position, and in the operation of the sprayers the pipes $o'$, with the spraying-nozzles on the respective ends thereof, are swung at the swivel-couplers $s\ s'$ by the foot of the operator pressing either down at the heel or down at the toe upon the platforms $t$, thus moving the pivot-shafts 28, cranks 29, and rods 30, so as to move the said shafts either in one direction or the other upon the swivel-couplers. It is necessary to provide this movement, as well as the possibility of changing the angular relation of the spraying-nozzles to the pipes $o'$, so as to accommodate the device to the variable widths of the rows of potato-vines or other plants upon which the liquid-sprayer acts.

In my improvement the beam $n$ and the bar $l$ are to be placed in the position shown in dotted lines in Fig. 3, where the hook $n'$ is caught over the slotted standard $n^2$, and in this way the mechanism is thrown out of action while the liquid-sprayer is moved from a place of storage to the field where the same is to be actively employed in spraying plants. The operator or attendant upon the seat of the machine (shown in Fig. 1) may place these parts out of action. The parts are thrown into action by disengaging the hook from the plate and bringing the parts into the position shown by full lines, Fig. 3, where the rotation of the axle $b$, the disk $k$, and studs 13 raise the bar $l$ to elevate the pump-plunger, the same being brought down by the action of the springs $m'$.

The operator with his feet upon the platforms $t$, as hereinbefore described, is to change the inclination of the pipes $o'$ and at the same time of the sprayers, and the inclination of the sprayers with reference to the pipes $o'$ is made by hand, so that between the operations the sprinklers are properly set for the widths of the rows of plants, and in the operation of the device the supply of liquid to the sprayers is controlled by the extent of discharge by the spraying-nozzles 20 21. A certain amount of resistance is of course produced at these nozzles in the discharge of the liquid laden with paris-green or other poisonous material and a back pressure is of course produced, and this is manifest both in the air-chamber and in the pump, and where there is that back pressure the pump only operates in proportion, because while the bar $l'$ is raised its full height by the rotation of the disk $k$ and the studs 13 the springs $m'$ only draw the pump-beam down to a point where their force and the pressure are equal. Consequently only a slight movement may be given to the pump-beam. It is preferable to fix the angle at which the pipes $o'$ may be set, and this is done by the operator moving the parts at the swivel-couplers, and at the same time the rods 32 are moved on their pivots to change the angle of the spraying-nozzles to the pipes $o'$.

It is obvious that other pressure devices may be employed in connection with the receptacle $h$ for paris-green or other similar material instead of the weight 19, but these would be equivalent devices.

Heretofore the paris-green has been mixed in the water-barrel $e$ with the water and has been drawn therefrom. This may be done in the present case, although I prefer the other devices, and where the same is done I employ a chain 34 and stirrers 35 in the barrel, as shown by dotted lines, so that the stirrers keep the water and poisonous material agitated in the barrel as the spraying devices are moved over the ground, there being a sprocket on the axle and a short shaft passing through the barrel also carrying a sprocket and the said stirrers.

In Fig. 5 I have clearly illustrated the water connections between the barrel, pump, air-cylinder, receptacle $h$, and the pipe extending therefrom, and it will be noticed that the opening from the pipe $e'$ into the pump is central of the pump and that the opening therefrom to the air-cylinder is adjacent to one edge and that the opening into the air-cylinder is central and that the pipe $g'$, extending therefrom and beneath the receptacle $h$, comes above the opening into the air-cylinder, and in Fig. 6 I have represented the packing and valve, preferably of such material as leather, forming a joint between the platform 15 and the flanged base of the pump, this packing having a circular slot, as shown in Fig. 6, leaving in the center the valve-flap and having above the same a notch fitting around the exit from the pump to the air-cylinder, and in Fig. 7 I have shown the packing and valve of the air-cylinder with the valve-flap in the center adapted to cover the central inlet-opening.

I claim as my invention—

1. In a liquid-spraying device, the combination with a pump-cylinder and inlet and exit pipes connected therewith, of a plunger and a pivoted beam connected therewith, a bar connected to the said pivoted beam and extending downward and occupying a substantially-vertical position, means for actuating the bar and plunger in one direction and other and independent means for actuating the same in the opposite direction, substantially as set forth.

2. In a liquid-spraying device, the combination with a pump-cylinder and inlet and exit pipes connected therewith, of a plunger and a pivoted beam connected therewith, a bar connected to the said pivoted beam and extending downward and occupying a substantially-vertical position, means for acting upon the bar and plunger to elevate the same and raise one end of the pump-beam, a yoke straddling the pump-beam and means for adjusting the same and springs connecting the said yoke to the platform of the liquid-spraying device, which springs act to draw down the pump-beam and to force out the liquid, substantially as set forth.

3. In a liquid-spraying device, the combination with a pump-cylinder and inlet and exit pipes connected therewith, of the plunger and a pivoted beam connected therewith, a bar connected to the said pivoted beam and extending downward and occupying a substantially-vertical position, a rotatable disk and means for actuating the same, studs on the said disk, adapted to come in contact with the lower end of the said bar to elevate the same and to raise one end of the pump-beam, and adjustable devices connected to the said pivoted beam for drawing down the same and forcing out the liquid, substantially as set forth.

4. In a liquid-spraying device, the combination with a pump-cylinder and inlet and exit pipes connected therewith, of a plunger and a pivoted beam connected therewith, a bar connected to the said pivoted beam and extending downward and occupying a substantially-vertical position, means for actuating the said bar and plunger to raise one end of the pump-beam, springs connected at their lower ends to the platform of the liquid-spraying device, and at their upper ends connected to an adjustable device in engagement with the pump-beam and which springs act to draw down the pump-beam and to force out the liquid, substantially as set forth.

5. In a liquid-sprayer, the combination with the frame, the wheels upon which the same is mounted, and the power devices actuated thereby, of a liquid-receptacle, a pump, spraying devices and pipes connecting the receptacle, the pump and the spraying devices, a receptacle located above the pipe between the pump and the spraying devices for holding paris-green or similar poisonous material in a moist condition, a regulatable connection between said receptacle and said pipe through which such poisonous material is delivered, a piston in said receptacle above the paris-green material and means for forcing down the piston to press the moist poisonous material into the liquid, substantially as set forth.

6. In a liquid-spraying device, the combination with a pump-cylinder and inlet and exit pipes connected therewith, of the plunger and a pivoted beam connected therewith, a bar connected to the said pivoted beam and extending downward and occupying a substantially-vertical position, a rotatable disk and means for actuating the same, studs on said disk adapted to come in contact with the lower end of the said bar to elevate the same and to raise one end of the pump-beam, a yoke straddling the pump-beam and means for adjusting the same, and springs connecting the said yoke to the platform of the liquid-spraying device, which springs act to draw down the pump-beam and to force out the liquid, substantially as set forth.

7. In a liquid-spraying device, the combination with a pump-cylinder and inlet and exit pipes connected therewith, of the plunger and a pivoted beam connected therewith, a bar connected to the said pivoted beam and extending downward and occupying a substantially-vertical position, a rotatable disk and means for actuating the same, studs on said disk adapted to come in contact with the lower end of the said bar to elevate the same and to raise one end of the pump-beam, a yoke straddling the pump-beam, and means for adjusting the same and springs connecting the said yoke to the platform of the liquid-spraying device, which springs act to draw down the pump-beam and to force out the liquid, and a beam parallel with the pump-beam, and a connection therefrom to the vertically-moving bar, and a means connected to the free end of the latter beam for swinging the bar rearward and holding the same out of action, substantially as set forth.

8. In a liquid-spraying device, the combination with a pump-cylinder and inlet and exit pipes connected therewith, of a plunger and a pivoted beam connected therewith, a bar connected to the said pivoted beam and extending downward and occupying a substantially-vertical position, a rotatable disk and means for actuating the same, studs on said disk adapted to come in contact with the lower end of the said bar to elevate the same and to raise one end of the pump-beam, a yoke straddling the pump-beam, and means for adjusting the same and springs connecting the said yoke to the platform of the liquid-spraying device, which springs act to draw down the pump-beam and to force out the liquid, and a beam parallel with the beam of the pump, and a connection from one end of the same to the vertically-moving bar for actuating the pump-beam, a slotted standard through which the opposite end of the latter beam passes, and a hook device on the free end of said beam adapted to engage the upper edge of the slotted standard and to draw the vertically-moving bar away from the devices for actuating the same, substantially as set forth.

9. In a liquid-spraying device, the combination with a pump, the pipes for liquid passing to and from the same and the plunger, of a beam connected to the plunger and pivoted to the frame of the liquid-spraying device, a bar connected to the free end of the said pump-beam, and means for raising the said bar to elevate the plunger of the pump, and a yoke $m$ pivoted at the pivot of the pump-beam and straddling the beam, and a set-screw passing through the upper part of said yoke and bearing upon the said beam for adjusting the relation of the yoke and the beam, and springs $m'$ connected at their upper ends to ends of the yoke at either side of the beam, and at their lower ends to the frame of the liquid-spraying device for drawing down the beam and plunger and forcing the liquid from the pump, substantially as set forth.

10. In a liquid-spraying device, the combination with devices for holding and for forcing the spraying liquid, of the spraying-nozzles, flexible adjustable connections therefrom to the pipe for supplying the liquid, and means substantially as set forth, and under the control of the feet of the driver or operator for changing the inclination of the spraying-nozzles and the direction of the liquid sprayed, substantially as set forth.

11. In a liquid-spraying device, the combination with the devices for holding and forcing the spraying liquid, of pairs of spraying-nozzles at either side of the machine, arms to which the said spraying-nozzles are connected, adjustable pivotal connections to said arms, and supports therefor from the frame of the machine, and means, substantially as specified, and under the control of the feet of the operator for changing the inclination of the spraying-nozzles and the direction of the spraying liquid, substantially as set forth.

12. In a liquid-spraying device, the combination with the devices for holding and forcing the spraying liquid, of the spraying-nozzles from which the liquid is discharged, a pipe and couplers at the ends thereof, and flexible connections therefrom to the said spraying-nozzles, and flexible connections from the said couplers to the supply-pipe of the machine, swivel-couplers connected to the said pipes and supports therefor connected to the frame of the machine, and set-screws at the swivel-couplers by the loosening or tightening of which the inclination of the spraying devices may be altered, and the devices clamped when set as desired, for delivering the spraying liquid, and platforms for the feet of the operator, supports for the said platforms and cranks and rods connected therewith and extending to the spraying devices, whereby the same may be shifted at the pleasure of the operator, substantially as set forth.

Signed by me this 27th day of December, 1899.

LEWIS AUGUSTUS ASPINWALL.

Witnesses:
E. L. ROSE,
DANIEL H. PERRY.